Aug. 31, 1954    G. R. PIPES    2,687,758
NUT AND LOCK WASHER ASSEMBLY
Filed Dec. 26, 1951
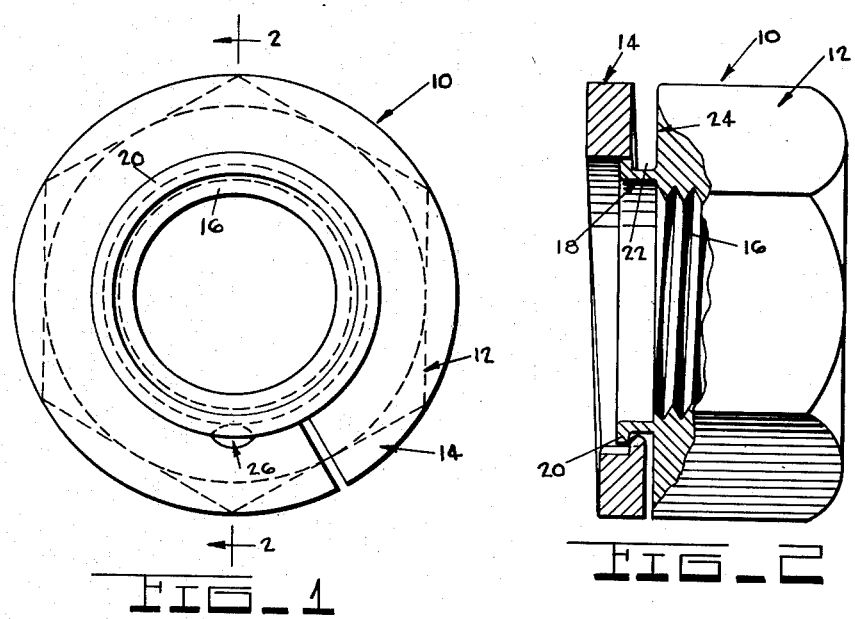
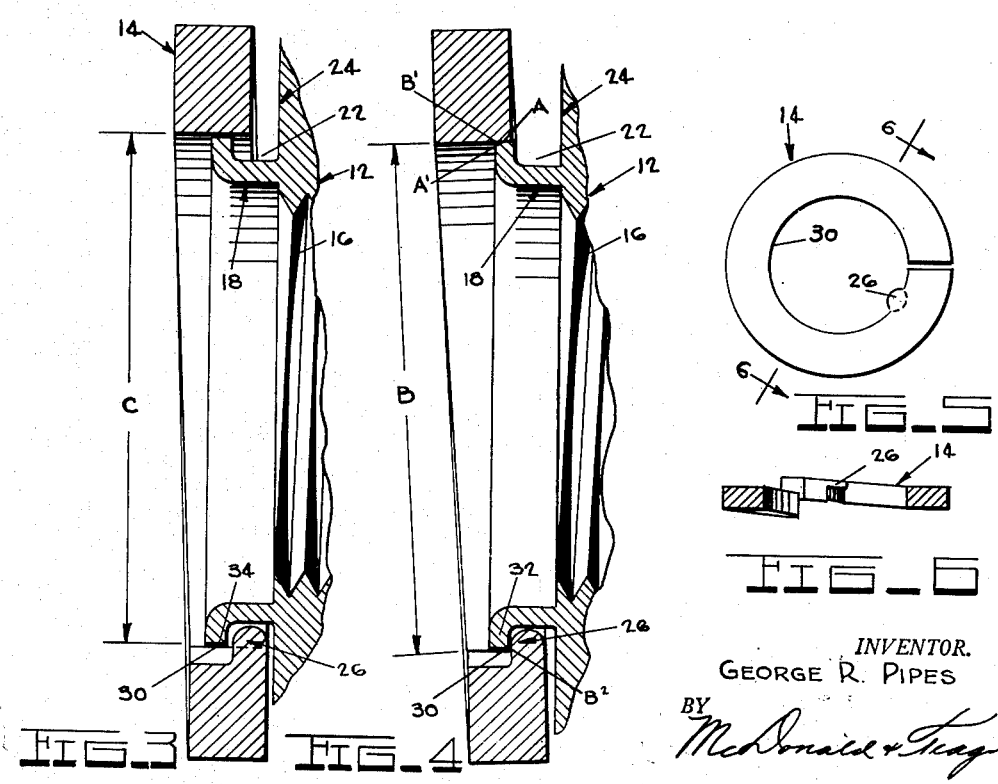
INVENTOR.
GEORGE R. PIPES
BY
ATTORNEYS Patented Aug. 31, 1954

2,687,758

UNITED STATES PATENT OFFICE 2,687,758

NUT AND LOCK WASHER ASSEMBLY

George R. Pipes, Mayfield Heights, Ohio, assignor to Eaton Manufacturing Company, Cleveland, Ohio, a corporation of Ohio Application December 26, 1951, Serial No. 263,193

1 Claim. (Cl. 151—37)

This invention relates to fastening devices and more particularly to a nut having a lockwasher coupled in assembly therewith.

Broadly the invention comprehends the provision of a nut and lockwasher assembly wherein cooperative parts of the nut and lockwasher provide for the maintenance of assembled coupling relation therebetween. The lockwasher herein is of the helical split variety and includes a projection on its inner periphery adapted to be received in an annular groove of the nut adjacent an annular flange thereof effective to retain the washer in assembly on the nut.

Numerous nut and lockwasher assemblies have been devised and commercially used but in all instances they have incorporated structures not conducive to ease of manufacture and assembly and which accordingly were not most economical. It is believed that the present structure is a decided improvement in these respects.

The principal objects of this invention are the provision of a nut and lockwasher assembly, that:

1. Is simple of structure, easy to assemble and economical of manufacture;

2. Requires a minimum of additional operations upon conventional nut and lockwasher members to adapt them to being a coupled assembly;

3. Permits of completing the respective nut and lockwasher members independently prior to coupled assembly thereof or completion of the nut member with the lockwasher member assembled thereon.

4. Effectively retains the lockwasher and nut in assembly in and out of use, with the lockwasher not in any way interfering with the application of the nut to an associated threaded member; and 5. Includes a helical axially compressible split lockwasher having one small projection on its inner periphery adapted to be received in an annular groove of a nut adjacent an annular flange of the nut.

Other objects and advantages of the invention will appear from the following description taken in connection with the drawings forming a part of the specification; and in which:

Fig. 1 is a bottom elevation view of a nut and lockwasher assembly;

Fig. 2 is a cross-sectional view taken along substantially lines 2—2 of Fig. 1;

Fig. 3 is an enlarged fragmentary cross-sectional view of the nut and lockwasher assembly with the lockwasher in a free state on the nut.

Fig. 4 is an enlarged fragmentary cross-sectional view of the nut and lockwasher assembly with the lockwasher moved to a position illustrating the interference occurring between the lockwasher and nut in the retention of the lockwasher on the nut.

Fig. 5 is a top elevation view of the lockwasher of Figs. 1 through 4; and

Fig. 6 is a cross-sectional view of the lockwasher taken substantially along lines 6—6 of Fig. 5.

This nut and lockwasher assembly was devised for the purpose of providing a simple structure which was easy to assemble and economical to manufacture while at the same time being effective in use.

As a means of insuring coupling relation between the nut and lockwasher members of the assembly for ease in the unitary handling thereof a split lockwasher is provided having a projection on its inner periphery adapted to be received in an annular groove in a nut adjacent an annular flange provided at one axial extremity of the nut. The lockwasher is adapted to be assembled upon the nut through the springing of the lockwasher onto the nut so that the projection on the lockwasher is received in the groove of the nut and the lockwasher is held in assembly thereon or by way of upsetting the annular flange to a diameter greater than the distance between the inner dimension of the projection and a point on the inner periphery of the lockwasher diametrically opposite to the projection. As herein devised the structural coupling relation recited is preferably applicable to split lockwashers of the conventional helical axially compressible type.

Referring to the drawings for more specific details of the invention 10 represents generally a nut and lockwasher assembly comprising a nut 12 and a helical axially compressible split lockwasher 14 in coupled relation to one another.

The nut 12 is of hexagonal form having an internal thread 16 and an axial unthreaded extension 18 including a radially outwardly extending annular flange 20 providing an annular external groove 22 adjacent thereto, the purpose of which will hereinafter appear.

The lockwasher 14 which is of generally conventional make has an internal diameter of slightly greater diameter than the external diameter of flange 20 and an axial height greater than the distance between the axial extremity of axial extension 18 and an annular face or surface 24 of the nut adjacent to the groove 22 on the opposite side thereof from flange 20, that is the lockwasher in its compressed state bearing axially against the face 24 extends axially beyond the axial extremity of extension 18. A projection 26 extending over a minor portion of the inner periphery of the lockwasher extends radially inwardly an amount substantially equal to the depth of the groove 22. It is to be noted that the projection 26 is of a thickness much less than the axial height of the lockwasher whereby the projection permits of the axial free extension of the lockwasher beyond the axial extremity of axial extension 18 thus permitting of the impingement of the one axial end surface of the lockwasher upon face 24 of the nut and the other axial end surface of the lockwasher upon the member to which the assembly is applied.

With the lockwasher in assembly on the nut the projection 26 is received in groove 22 whereby because of the comparative dimensions of the lockwasher 14 and flange 20 and projection 26 and groove 22, the lockwasher although being held in assembly on the nut is free to turn relatively thereto such that the friction of the lockwasher is in no way interfered with.

Figs. 3 and 4 illustrate the relationship of the lockwasher to the nut by means of which the lockwasher is restrained from separation from the nut. As shown by Fig. 4 wherein the junction of the underside 28 of projection 26 and inner periphery 30 of the lockwasher engage respectively the junction of the wall 32 of the groove and the outer periphery 34 of the flange 20, and wherein although the inner periphery 30 of the lockwasher diametrically opposite from the center of projection 26 is normally spaced apart from the outer periphery 34 of the flange 20 as shown by Fig. 3, any attempt to remove the lockwasher from the nut will result in a zone A on the lockwasher interfering with a zone $A^1$ on the flange of the nut. This interference occurs as a result of the lockwasher being restrained from either axial movement or appreciable radial movement relative to the nut at the projection point engagement of the lockwasher and the nut wherein the diagonal dimension B of the flange between points $B^1$ and $B^2$ is greater than the inner diameter C of the lockwasher.

The projection is preferably made of inward radial extension substantially equal to or less than the depth of groove 22 so as to prevent any possibility of interference between the bottom of the groove and the inner dimension of the projection. Furthermore its thickness relative to the width of the groove is not critical just so long as it is free fitting in respect thereto. The location of the projection is preferably as shown by the drawings made adjacent one axial face 36 of the lockwasher, that is the face of the lockwasher adapted to bear against the face 24 of the nut, and near the split of the lockwasher. By so locating the projection near the split of the lockwasher, a uniform helix can be provided throughout the length thereof.

As shown the projection is swaged from the lockwasher cross-section proper although any of several ways of forming it can equally as well serve a like purpose.

In assembling the lockwasher to the nut it is possible, through the utilization of predetermined dimensions of the several cooperative parts of the lockwasher and nut as represented by the drawings, to hook the projection 26 in the groove 22 and by means of applying a sufficient axial force to the lockwasher to spring zone A of the lockwasher over the zone $A^1$ of the nut effective to couple the lockwasher and nut together.

Another method of assembly would be to place the lockwasher and nut together with the one axial portion of the lockwasher abutting face 24 of the nut and then form the flange 20 by bending a straight section radially outwardly to the shape shown.

While this invention has been described in connection with certain specific embodiments, the principle involved is susceptible of numerous other applications that will readily occur to persons skilled in the art. The invention, therefore, is limited only as indicated by the scope of the appended claim.

What I claim is:

In combination, a screw threaded fastener having an annular bearing surface lying in a plane perpendicular to its axis, a sleeve integral with the fastener extending axially away from the annular bearing including at its free extremity an annular shoulder axially spaced from the bearing surface providing an external annular groove therebetween with the bearing surface, and an annular surface adjacent the shoulder disposed on the axial opposite side of the shoulder from the groove, and an axially compressible split lockwasher arranged in concentric relation to the annular groove and shoulder of the fastener having an end face adapted to bear axially against the annular bearing surface on the fastener, an internal diameter of slightly greater dimension than the maximum diameter of the shoulder and a projection, arranged on the inner periphery of the lockwasher, received in the groove, said projection extending radially inward of and circumferentially over a proportionately very small part of the inner periphery of the lockwasher with the projection having an axial thickness less than the axial thickness of the lockwasher and positioned adjacent the end face of the lockwasher adapted to have axial bearing relation with the bearing surface of the fastener, and with the radial inward extension and circumferential extension of the projection and depth of the groove being approximately the same dimension and wherein the diagonal dimension across the annular shoulder is slightly greater than the inner diameter of the lockwasher such that with the projection adjacent the shoulder thereof, interference results, between a peripheral portion of the shoulder and a portion of the internal periphery of the lockwasher diametrically opposite from the projection, restraining uncoupling of the fastener and lockwasher.

References Cited in the file of this patent

UNITED STATES PATENTS

| Number | Name | Date |
| --- | --- | --- |
| 1,883,068 | Stoll | Oct. 18, 1932 |

FOREIGN PATENTS

| Number | Country | Date |
| --- | --- | --- |
| 662,175 | Great Britain | Dec. 5, 1951 |